United States Patent
Douglas

(10) Patent No.: US 7,398,695 B2
(45) Date of Patent: Jul. 15, 2008

(54) UNIVERSAL CONVERTER PLATE FOR PRESSURE TRANSMITTERS

(75) Inventor: Ronald Douglas, Tomball, TX (US)

(73) Assignee: Unique Industrial Product Company, Sugar Land, TX (US)

( * ) Notice: Subject to any disclaimer, the term of this patent is extended or adjusted under 35 U.S.C. 154(b) by 0 days.

(21) Appl. No.: 11/588,598

(22) Filed: Oct. 27, 2006

(65) Prior Publication Data

US 2008/0110272 A1    May 15, 2008

(51) Int. Cl.
*G01L 7/00*    (2006.01)

(52) U.S. Cl. .................................................. 73/756

(58) Field of Classification Search ............ 73/700–756
See application file for complete search history.

(56) References Cited

U.S. PATENT DOCUMENTS

| | | | |
|---|---|---|---|
| 5,036,884 A * | 8/1991 | Miller et al. ................. | 137/597 |
| 5,118,073 A | 6/1992 | Hutton | |
| 5,277,224 A | 1/1994 | Hutton et al. | |
| 5,494,071 A * | 2/1996 | Bell et al. .................... | 137/597 |
| 5,709,247 A | 1/1998 | Hutton | |
| 5,803,123 A * | 9/1998 | Bell et al. .................... | 137/884 |
| 5,848,607 A * | 12/1998 | Bell et al. .................... | 137/597 |
| 5,868,155 A | 2/1999 | Hutton | |
| D407,984 S | 4/1999 | Hutton et al. | |
| D410,398 S | 6/1999 | Hutton et al. | |
| D415,703 S | 10/1999 | Hutton et al. | |
| 5,988,203 A | 11/1999 | Hutton | |
| 6,000,427 A | 12/1999 | Hutton | |
| D423,387 S | 4/2000 | Hutton | |
| 6,079,443 A | 6/2000 | Hutton | |
| D427,931 S | 7/2000 | Hutton | |
| 6,672,173 B2 * | 1/2004 | Bell ........................ | 73/861.52 |

OTHER PUBLICATIONS

Nelson, Scott: "Rosemount Coplanar Design Creates Market for Manifold Makers", Industry Watch, Feb. 1997 vol. 16.

* cited by examiner

*Primary Examiner*—Andre J. Allen
*Assistant Examiner*—Jermaine Jenkins
(74) *Attorney, Agent, or Firm*—Madan, Mossman & Sriram, P.C.

(57) ABSTRACT

An apparatus for mating a base unit with a transmitter unit has a first face provided with a plurality of bores that spatially conform to a pattern of the mounting elements of the base unit and a second face that has a plurality of bores that spatially conform to the pattern of the mounting elements of the transmitter unit. To hydraulically connect the flow bores of the base unit and the transmitter unit, the plate includes a plurality of fluid conduits. Each flow conduit hydraulically connects a flow bore of the base unit to an associated flow bore of the transmitter unit.

6 Claims, 2 Drawing Sheets

UNIVERSAL CONVERTER PLATE FOR PRESSURE TRANSMITTERS

CROSS-REFERENCE TO RELATED APPLICATIONS

None.

BACKGROUND OF THE INVENTION

1. Field of the Invention

The present invention relates to a field mounted measurement transmitters.

2. Description of the Related Art

Fluids such as liquids and gases are often conveyed via flow lines fitted with instrumentation that measures flow parameters such as pressure, temperature and flow rates. One exemplary type of instrumentation is a differential transmitter. In some arrangements, several pressure transmitters are strategically positioned along the flow line and transmit pressure readings to a desired location such as a central control room. As is generally, known pressure measurements along flow lines can be of critical importance because operating pressure must be kept within prescribed ranges to ensure safety and efficient operations. Moreover, due to their length, flow lines can require dozens, if not hundreds, of pressure transmitters and differential pressure transmitters to ensure adequate monitoring of flow. Conventionally, a differential pressure transmitter consists of a base unit and a transmitter unit. The base unit, which can include manifolds and suitable flanges, is fixed onto a section of a flow line. The transmitter unit, which includes the pressure sensor and transmitter, is thereafter mated with the base unit. During operations, the transmitter unit can occasionally fail. Typically, the differential pressure transmitter is sold as a unit. Thus, the entire assembly may have to be ordered even though the base unit does not have to be replaced. In other instances, the mating arrangement between the differential transmitter and the base unit does not conform to a particular industry generic form. In either of these situations, it can be costly and time-consuming to replace a defective pressure transmitter.

The present invention addresses these and other drawbacks of the prior art.

SUMMARY OF THE INVENTION

In aspects, the present apparatus provides an apparatus for mating a base unit with a transmitter unit. In particular, the apparatus, which is generally in the shape of a platen member, is advantageous where the base unit is a manifold that has a plurality of flow bores arranged according to a first pattern and the transmitter unit has a plurality of flow bores arranged according to a second pattern that is different from the first pattern. In one arrangement, a plate member is sized and shaped to be interposed between the base unit and the transmitter unit. To structurally or physically connect the base unit and the transmitter unit, the plate member has a plurality of mounting bores that spatially conform to the pattern of the mounting elements of the base unit and the transmitter unit. To hydraulically connect the flow bores of the base unit and the transmitter unit, the plate includes a plurality of fluid conduits. Each flow conduit hydraulically connects a flow bore of the base unit to an associated flow bore of the transmitter unit. In a preferred arrangement, each fluid conduit has a diameter that is smaller than the diameter of either the flow bores of the base unit or the transmitter unit. Additionally, the long axis of each fluid conduit is offset from a long axis of each flow bore of the base unit and the transmitter unit. To ensure a fluid seal, a seal element provided on the faces of the plate surrounds each opening of a flow bore the base unit, and the transmitter unit upon installation and/or for pre-existing manifolds.

It should be understood that examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENTS

Figure 1:
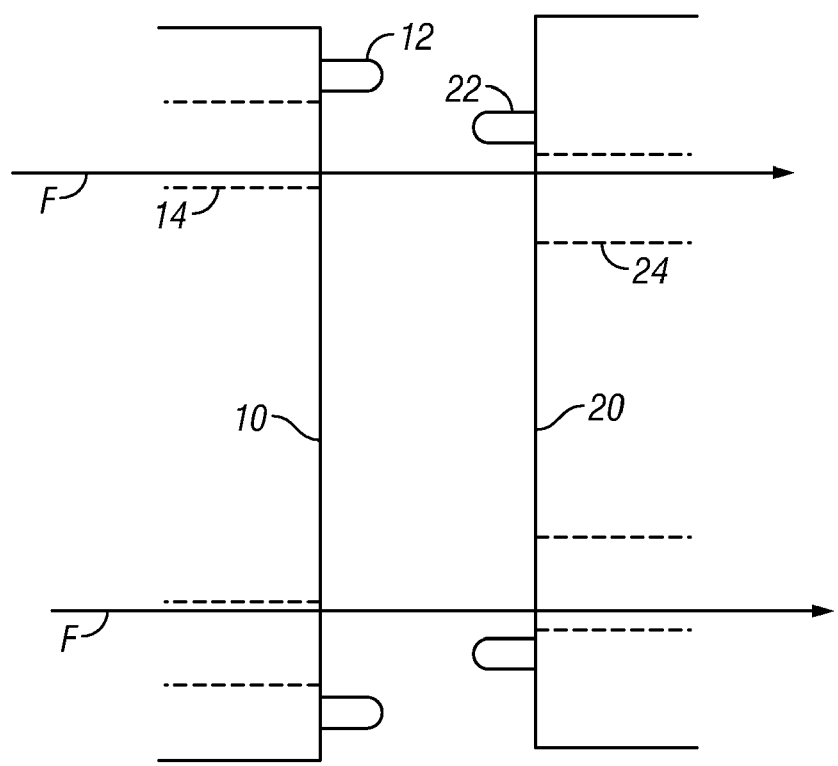
FIG. 1 schematically illustrates a conventional arrangement wherein a mating pattern for a base unit is incompatible with a mating pattern for a transmitter unit.

The present invention relates to devices and methods for mating a transmitter unit with a base unit, which is typically a manifold. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. Indeed, as will become apparent, the teachings of the present invention can be utilized for a variety of applications that utilize differential pressure transmitters to monitor flow. Such applications include, but are not limited to, refining facilities, petrochemical facilities; gas transmission facilities including custody transfer; pipe lines and conduits for water and other utilities; HVAC systems; flow control systems, etc. It is emphasized that the embodiments hereinbelow advantageously do not require or incorporate any valves. Accordingly, the embodiments discussed below are merely illustrative of the applications of the present invention.

Referring initially to FIG. 1, there is shown a portion of a base unit 10 and a portion of a transmitter unit 20. In one arrangement, the base unit 10 is a manifold that includes flow bores 12 for conveying fluid to and from a flow line such as a pipe line. Conventionally, the base unit 10 also includes a manifold device having suitable valve mechanisms. The transmitter unit 20 also includes flow bores 22 and usually incorporates suitable electronics for measuring pressure and transmitting signals representative of the measurements. The flow bores 12, 22 can support bi-directional flow of liquids and gases; i.e., fluid flowing either to or from the transmitter unit 20. The base unit 10 and the transmitter unit 20 can also include flanges with suitable holes for receiving mounting elements such as alignment pins or coupling devices such as threaded members. The remaining features and components of the base unit 10 and the transmitter unit 20 are well known and will not be discussed in further detail.

The FIG. 1 arrangement illustrates one scenario wherein the flow bores 22 of the transmitter unit 20 are aligned according to one pattern but the corresponding flow bores 12 of a base unit 10 are aligned according to a different pattern. Because of the axial misalignment between the flow bores 12 and 22, the transmitter unit 20 cannot be mounted on the base unit 10 to establish a flow F between the flow bores 12 and 22. This scenario can arise by the flow bores 12 of the base unit 10 being aligned according to a generally prevalent mounting pattern but the corresponding flow bores 22 of the transmitter unit 20 being aligned according to a mounting pattern different from the same prevalent pattern, or vice versa.

Figure 2:
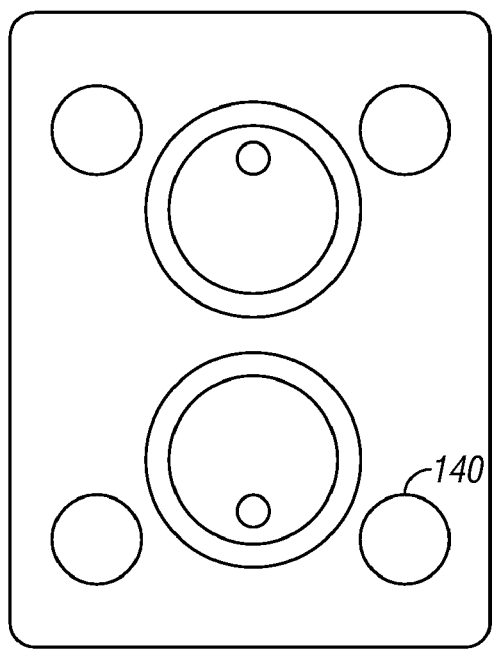
FIG. 2 schematically illustrates one embodiment of an converter element made in accordance with the present invention in a bottom view.
Figure 3:
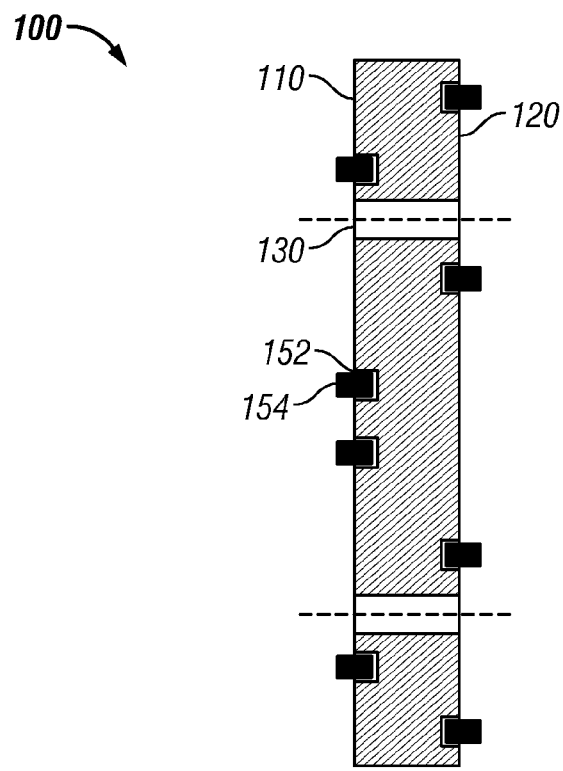
FIG. 3 schematically illustrates one embodiment of an converter element made in accordance with the present invention in a cross-sectional side view.
Figure 4:
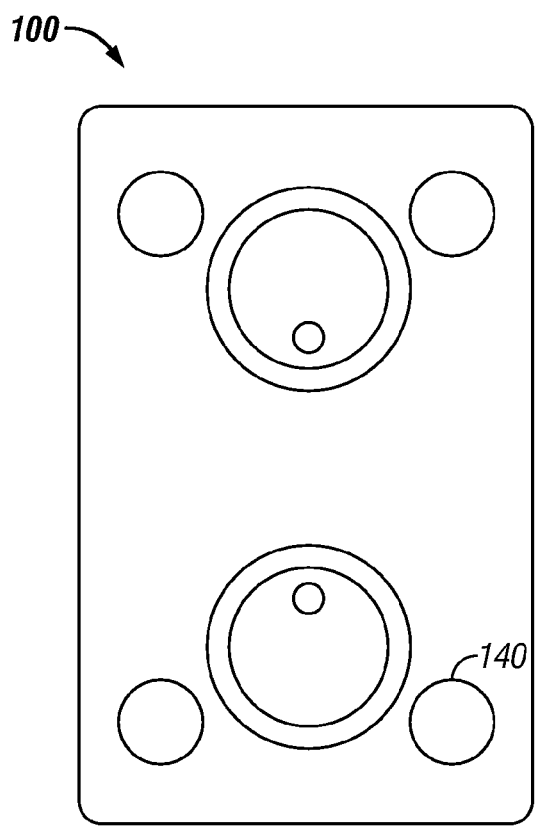
FIG. 4 schematically illustrates one embodiment of an converter element made in accordance with the present invention in a top view.

Referring now to FIGS. 2-4, there is schematically illustrated several views of an embodiment of a converter plate 100 made in accordance with the present invention for mating the base unit 10 to the pressure unit 20. The converter plate 100 is a relatively thin and rigid platen member that is shaped and sized to fit between the base unit 10 and the pressure unit 20. While the plate 100 is shown as rectangular, other shapes can be also be suitable. Additionally, the plate 100 is preferably formed of material that resists the corrosive effects of flowing fluid and can withstand exposure to an industrial or open air environment. The plate 100 includes a first face 110 that seats against the base unit 10 and a second face 120 that seats against the transmitter unit 20.

To establish a hydraulic or fluid connection between the base unit 10 and the transmitter unit 20, the plate 100 includes flow conduits 130. The flow conduits 130 are passages formed in the plate 100 that convey fluid between the flow bores 12 and 22. The flow conduits 130 have a diameter smaller than either of the flow bores 12 and 22. The inventor has recognized that such an arrangement of the diameters of the flow conduits 130, while reducing the cross-sectional flow area, nevertheless enables hydraulic communication sufficient for proper operation of the transmitter unit 20. As shown, the flow conduits 130 run generally parallel with the flow bores 120 and 120, but an angled or tortuous route may be useful in some applications.

Advantageously, the relatively smaller diameter of the flow conduits 130 increases the surface area available to seal off the mating interfaces between the plate 100 and the base unit 10 and the transmitter unit 20. In one arrangement, to seal the flow channel formed by the flow bore 12, the flow conduit 130, and the flow bore 22, the openings at each face 110, 120 of the flow bores 130 are surrounded by a recess 152 for receiving seals 154. In embodiments where the recesses 152 are circular, the recesses 152 are oriented generally concentric with the axial centerlines of the flow bores 12 and 22. Thus, the seals 154 are generally concentrically aligned with the opening of the flow bores 12 and 22 rather than the opening of the flow conduit 130, but need not be always the case. It should be appreciated that the flow channel is a substantially leak proof pathway that allows fluid to flow between the otherwise misaligned flow bores 12 and 22.

The plate 100 also includes mounting bores 140 spatially positioned to correspond with and receive the mounting elements (not shown) associated with the base unit 10 and the transmitter unit 20. The mounting bores 140 can be through holes and can include one or more threaded sections.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

The invention claimed is:

1. A method for mating a pre-exiting base unit with a transmitter unit where the base unit has a plurality of mounting elements and flow bores arranged according to a first pattern and the transmitter unit has a plurality of mounting elements and flow bores arranged according to a second pattern that is different from the first pattern, the method comprising, comprising:

(a) forming a plurality of mounting bores in a plate that correspond to the pattern of the mounting elements of the base unit and the transmitter unit;

(b) forming a plurality of fluid conduits through the plate, each fluid conduit hydraulically coupling each flow bore of the base unit to an associated flow bore of the transmitter unit, each fluid conduit having a diameter that is smaller than the diameter of flow bores of the base unit and the transmitter unit, each fluid conduit having a long axis that is offset from a long axis of each flow bore of the base unit and the transmitter unit; and (c) interposing the plate between the base unit and the transmitter unit.

2. The method of claim 1 further comprising sealing each fluid conduit using a seal element that surrounds an opening of the flow bores of one of (i) the base unit, and (ii) the transmitter unit.

3. The method of claim 2 wherein the long axis of each fluid conduit is parallel with the long axis of each associated flow bore of the base unit and the transmitter unit.

4. An apparatus for mating a base unit with a transmitter unit where the base unit has a plurality of flow bores arranged according to a first pattern and the transmitter unit has a plurality of flow bores arranged according to a second pattern that is different from the first pattern, the apparatus comprising:

a generally planar plate member interposable between the base unit and the transmitter unit, the plate member comprising:

(i) a plurality of mounting bores that spatially conform to the pattern of the mounting elements of the base unit and the transmitter unit; and (ii) a plurality of fluid conduits formed through the plate, each flow conduit hydraulically connecting a flow bore of the base unit to an associated flow bore of the transmitter unit, each fluid conduit having a diameter that is smaller than the diameter of flow bores of the base unit and the transmitter unit, each fluid conduit having a long axis that is offset from a long axis of each flow bore of the base unit and the transmitter unit.

5. The apparatus of claim 4 further comprising a plurality of seal elements, each seal element surrounding an opening of a flow bore of one of (i) the base unit, and (ii) the transmitter unit.

6. The apparatus of claim 5 wherein the long axis of each fluid conduit is parallel with the long axis of each associated flow bore of the base unit and the transmitter unit.

* * * * *